United States Patent
Roper (10) Patent No.: US 12,482,024 B2
(45) Date of Patent: Nov. 25, 2025

(54) METHODS AND SYSTEMS FOR CREATION OF COMPETITIVE THIRD-PARTY POLITICAL COMMUNICATION SLATE

(71) Applicant: Xavier Roper, Buffalo, NY (US)

(72) Inventor: Xavier Roper, Buffalo, NY (US)

(*) Notice: Subject to any disclaimer, the term of this patent is extended or adjusted under 35 U.S.C. 154(b) by 371 days.

(21) Appl. No.: 17/966,234

(22) Filed: Oct. 14, 2022

(65) Prior Publication Data

US 2024/0127299 A1   Apr. 18, 2024

(51) Int. Cl.
G06Q 30/02      (2023.01)
G06Q 20/10      (2012.01)
G06Q 30/0283    (2023.01)

(52) U.S. Cl.
CPC ......... *G06Q 30/0283* (2013.01); *G06Q 20/10* (2013.01)

(58) Field of Classification Search
CPC .................................. G06Q 30/0283
See application file for complete search history.

(56) References Cited

U.S. PATENT DOCUMENTS

| | | | | |
|---|---|---|---|---|
| 2015/0006366 A1* | 1/2015 | Sobhani | ................. | G06Q 20/06 705/39 |
| 2021/0319479 A1* | 10/2021 | Taudes | ................. | G06Q 20/02 |
| 2022/0261821 A1* | 8/2022 | Burton | ................. | G06F 40/295 |

* cited by examiner

*Primary Examiner* — Scott C Anderson
(74) *Attorney, Agent, or Firm* — Law Office of Vincent LoTempio PLLC; Vincent G. LoTempio; Robert L. Cerasa (57) ABSTRACT

A method and system for management and monitoring of leverage relating to low margins of a win in swing districts to command higher prices for political communications. The method includes selecting candidates, and a political party per election for elections. The candidate and the political party receive a free slate of political communications. The method includes offering at least one of one or more paid slate of political communications, and one or more slate of endorsements each, on behalf of each candidate and the political party. The method includes providing only one paid slate of political communications to solicited candidate constituencies per political communication cycle. The method includes initiating timers and receiving political communication requests and payments. The method includes creating a slate of political communications, and endorsements on behalf of a major candidate if the political communication requests and payments are received within a period of the timers.

15 Claims, 5 Drawing Sheets

Fig. 4 Example Computer System

Fig. 5

METHODS AND SYSTEMS FOR CREATION OF COMPETITIVE THIRD-PARTY POLITICAL COMMUNICATION SLATE

TECHNICAL FIELD

The presently disclosed embodiments are related, in general, to data processing and a competitive third-party political communication slate creation. More particularly, the presently disclosed embodiments are related to methods and systems to leverage low margins of a win in one or more swing districts to command higher prices for political advertising.

BACKGROUND

The creation and distribution of Political Communications is a process with discrete parts. The order and specification of the actions that are taken to do so are codified, to the point that some guidelines and laws define the taxonomy of their varying types.

Traditionally, when creating these, candidate representatives purchase a political communication to their specifications and hope to influence a not-so-specific amount of the electorate within the distribution area, based on the merits of what is included within the communication, with no guarantee of the outcome, and less than accurate metrics of measuring and controlling the influence that such political communications have.

Nonetheless, these actions lend themselves to the support of major party candidates in particular, at least in part due to the sheer number of supporters to choose from, areas to distribute to, and the statistical ramifications of having party supporters that make up close to 50% of the voters on average during an election cycle.

However, that which is traditionally done is not necessarily the only way to take advantage of the integral actions, laws, and guidelines surrounding the creation and distribution of political communications. Especially as they pertain to the support of the electorate that has ideals and goals less aligned with the most popular candidates.

In short, using the traditional methods of creating and distributing political communications are good for certain standard demographics, to attain certain standard goals, but are not especially useful for other, generally smaller demographics.

This demonstrates a need for more concise systems and methods of leveraging what few resources non-major candidate-aligned voters have.

An opportunity exists to operate a more potent third-party sympathetic political strategy based on some considerations of the current political landscape that have heretofore been taken for granted.

The first is a by-product of the fact that the internet and social media now exist at a quality and speed that make coordinating and distributing information significantly easier than when most of the rules surrounding political communications were set forth. The second is that of the several types of organizations authorized to influence the selection, nomination, election, appointment, or defeat of candidates to federal, state, or local public office, independent expenditure-only political action committees are relatively new, and allow for the collection of an unlimited amount of money on the behalf of political influence.

With this in mind, other politically relevant goals can be achieved using the rules and guidelines that exist for traditional political communication distribution campaigns, particularly as they serve a one-dimensional strategy when used creatively.

Although the traditional goal of political communication distribution is the distribution of the advertisements and endorsements themselves, creative interpretations of the guidelines set forth can be used to provide greater accuracy of certain statistical demographic measures, which can, in turn, be used to command greater prices for certain political communications.

Further limitations and disadvantages of conventional approaches will become apparent to one of skill in the art, through comparison of described systems with some aspects of the present disclosure, as set forth in the remainder of the present application and with reference to the drawings.

SUMMARY

According to embodiments illustrated herein, there may be provided a method for management and monitoring of leverage relating to low margins of a win in one or more swing districts to command higher prices for political communication. The method may be implemented by an application server including one or more processors. The method may select at least one of one or more candidates and a political party per election for one or more elections via one or more mobile devices. In an embodiment, one or more of the candidates, and the political party receive a free slate of political communication. The method may offer at least one of one or more paid slate of political communications, and one or more slate of endorsements each, on behalf of each candidate and the political party. The method may provide only one paid slate of political communications to one or more solicited candidate constituencies per political communication cycle. The method may provide a free slate of political communications to a major candidate of choice if neither party responds to nor pays for any slates beforehand. The method may initiate one or more timers and receive one or more political communication requests and payments. The method may create a slate of one or more political communications, and one or more endorsements on behalf of a major candidate if the one or more political communication requests and payments are received within a period of the timers. The method may reject the one or more political communication requests, and the payments within the election cycle upon expiration of the timers.

According to embodiments illustrated herein, there may be provided a system that includes an application server configured to manage and monitor leverage relating to low margins of a win in one or more swing districts to command higher prices for political communications. The application server may further include one or more processors configured to select at least one of one or more candidates and a political party per election for one or more elections via one or more mobile devices. In an embodiment, the one or more of the candidate, and the political party receive a free slate of political communications. The application server may further include one or more processors configured to offer at least one of one or more paid slate of political communications, and one or more slate of endorsements each, on behalf of each candidate and the political party. The application server may further include one or more processors configured to provide only one paid slate of political communications to one or more solicited candidate constituencies per political communication cycle. The application server may further include one or more processors configured to provide a free slate of political communications to a major candidate of choice if neither party responds to nor pays for any slates beforehand. The application server may further include one or more processors configured to initiate one or more timers and receive one or more political communication requests and payments. The application server may further include one or more processors configured to create a slate of one or more political communications, and one or more endorsements on behalf of a major candidate if the one or more political communication requests and payments are received within a period of the timers. The application server may further include one or more processors configured to reject the one or more political communication requests, and the payments within the election cycle upon expiration of the timers.

In an aspect, the system and method of the present invention can utilize online media and traditional "offline" media such as print, the radio, and television to distribute political communication. Online media such as internet advertising is an option, but not integral to the present invention. Online media enables and motivates people to vote in line with the political communications that are printed and created.

Accordingly, one advantage of the present invention is that it provides a tool to drain money from the major political parties. By offering a number of votes higher than the margin of win, and having a mechanism to prove the number of votes being used as leverage, the present invention gives major parties a centralized organization to legally hand this money.

Accordingly, one advantage of the present invention is that political communication act as a tool to collect money on behalf of a finite amount of voters.

Accordingly, one advantage of the present invention is that it convinces a large population to vote by using the information supplied to them beforehand. Then, using the political communications (which must be purchased and created in a specific manner as dictated by federal guidelines) as a tool to collect money. Political communications may be distributed anywhere. Afterward once the other steps are enacted, and ideally, both parties have paid for a political communication, the neutralization process helps to more concretely prove what demographic participated in the vote and to what capacity/how many people participated.

BRIEF DESCRIPTION OF DRAWINGS

The accompanying drawings illustrate the various embodiments of systems, methods, and other aspects of the disclosure. Any person with ordinary skills in the art will appreciate that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another and vice versa. Further, the elements may not be drawn to scale.

Various embodiments will hereinafter be described in accordance with the appended drawings, which are provided to illustrate and not to limit the scope in any manner, wherein similar designations denote similar elements, and in which.

DETAILED DESCRIPTION

The present disclosure may be best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment," "one example," "an example," "for example," and so on indicate that the embodiment(s) or example(s) may include a particular feature, structure, characteristic, property, element, or limitation but that not every embodiment or example necessarily includes that particular feature, structure, characteristic, property, element, or limitation. Further, repeated use of the phrase "in an embodiment" does not necessarily refer to the same embodiment.

Figure 1:
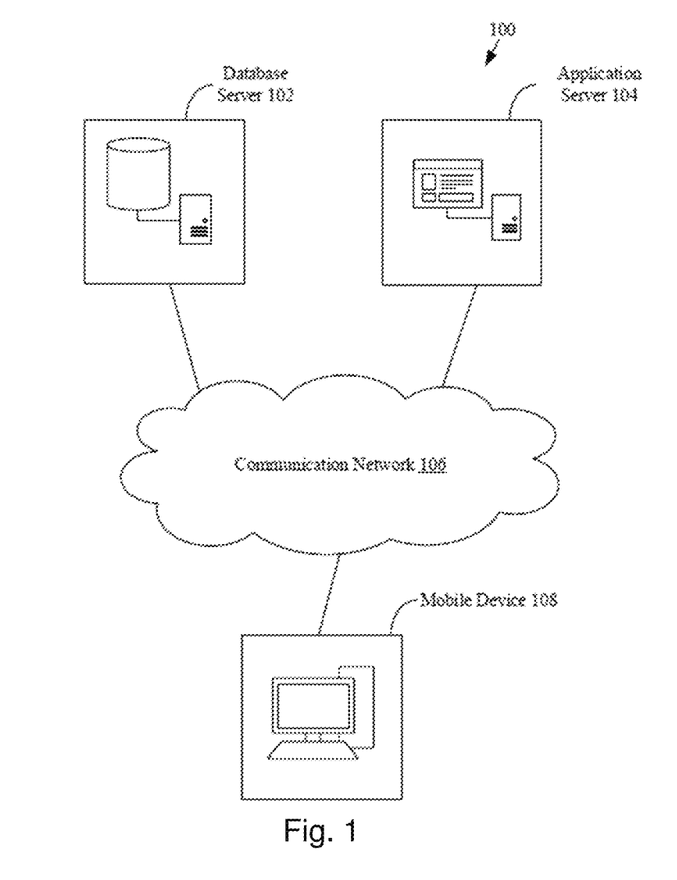
FIG. 1 is a block diagram that illustrates a system environment in which various embodiments of the method and the system may be implemented.

FIG. 1 is a block diagram that illustrates a system environment 100 in which various embodiments of the method and the system may be implemented.

The system environment 100 may include a database server 102, an application server 104, a communication network 106, and one or more mobile devices 108a, 108b, . . . , 108n collectively referred to with the numeral 108 that may be associated with one or more users (not shown). The database server 102, the application server 104, and the one or more mobile devices 108 may be communicatively coupled with each other via the communication network 106. In an embodiment, the application server 104 may communicate with the database server 102 using one or more protocols such as, but not limited to, Open Database Connectivity (ODBC) protocol and Java Database Connectivity (JDBC) protocol. In an embodiment, one or more mobile devices 108 may communicate with the application server 104, via the communication network 106.

In an embodiment, the database server 102 may refer to a computing device that may be configured to store the content related to political communication of one or more genres that may be showcased at one or more locations. In an embodiment, the database server 102 may include a special-purpose operating system specifically configured to perform one or more database operations on the content related to political communication. Examples of database operations may include, but are not limited to, Select, Insert, Update, and Delete. In an embodiment, the database server 102 may include hardware that may be configured to perform one or more predetermined operations. In an embodiment, the database server 102 may be realized through various technologies such as, but not limited to, Microsoft® SQL Server, Oracle®, IBM DB2®, Microsoft Access®, PostgreSQL®, MySQL® and SQLite®, and the like.

In an embodiment, the database server 102 may be configured to utilize the application server 104 to manage and monitor leverage relating to low margins of a win in one or more swing districts to command higher prices for political communication. The database server 102 may be configured to transmit the content related to political communication to the application server 104 for data processing, via the communication network 106. In an embodiment, the database server 102 may be configured to transmit the content related to political communication to one or more devices at one or more locations for showcasing the content related to political communication.

A person with ordinary skills in the art will understand that the scope of the disclosure is not limited to the database server 102 as a separate entity. In an embodiment, the functionalities of the database server 102 can be integrated into the application server 104.

In an embodiment, the application server 104 may refer to a computing device or a software framework hosting an application or a software service. In an embodiment, the application server 104 may be implemented to execute procedures such as, but not limited to, programs, routines, or scripts stored in one or more memories for supporting the hosted application or the software service. In an embodiment, the hosted application or the software service may be configured to perform one or more predetermined operations. The application server 104 may be realized through various types of application servers such as, but are not limited to, a Java application server, a .NET framework application server, a Base4 application server, a PHP framework application server, or any other application server framework.

In an embodiment, the application server 104 may be configured to select at least one of one or more candidates, and a political party per election for one or more elections via one or more mobile devices 108. In an embodiment, the one or more of the candidate, and the political party receive a free slate of political communications. The application server 104 may be configured to offer at least one of one or more paid slates of political communications, and one or more slates of endorsements each, on behalf of each candidate and the political party. The application server 104 may be configured to provide only one paid slate of political communications to one or more solicited candidate constituencies per political communicating cycle. The application server 104 may be configured to provide a free slate of political communications to a major candidate of choice if neither party responds to nor pays for any slates beforehand. The application server 104 may be configured to initiate one or more timers and receive one or more political communication requests and payments. The application server 104 may be configured to create a slate of one or more political communications, and one or more endorsements on behalf of a major candidate if the one or more political communication requests and payments are received within a period of the timers. The application server 104 may be configured to upon expiration of the timers, reject the one or more political communication requests, and the payments within the election cycle. The application server 104 may be configured to initiate a partial neutralization if one or more offered political communications or offered endorsements have been paid for within the election cycle and the timers have expired with no opportunity for further payment. In an embodiment, the slate is one or more political communications/endorsements on behalf of the same candidate, in a row, uninterrupted by the endorsement of another candidate.

The application server 104 may be configured to initiate a neutralization if all the offered political communications or offered endorsements have been paid for within the election cycle and the election cycle ends. The neutralization is initiated under one or more conditions selected from one or more of creating a political communication directing a plurality of citizens to vote in a manner to splits the total amount of votes as evenly as possible between the remaining candidates of each election using a reliable equitable splitting algorithm for all participatory parties; dividing the districts of an equitable political value among the appropriate parties equitably by directing the vote accordingly, as able, to said parties, per election cycle; choosing a non-affiliated, and historically low turnout (statistically trackable) third party candidate, and create the political communication or endorsement in support of them; directing the voting block in any given area not to vote in an election; if there are more than two major parties determined to be of value, a partial neutralization may take place. In an embodiment, the partial neutralization will have a political communication and endorsement created on behalf of all paying parties if this is determined to be a strategy of value; and allow the voters to vote as they please, with no specific coordination effort on the organizer's part. The application server 104 may be configured to determine whether a further political communicating cycle is required. The application server 104 may be configured to provide an opportunity to one or more candidates to pay for the one or more of the slate of the political communications and the slate of the endorsements per election cycle. Thus, in event of the partial neutralization, an additional cycle may be presented, but all parties that were offered a political communication slate, and did not pay for the initial cycle are excluded from further ad slates within the election cycle. The application server 104 may be configured to perform a plurality of operational steps comprising: selecting democratic and republican parties; openly making the offer, and defining guidelines; defining the political communication cycle; defining a timer schedule; creating the slate of political communications if they are paid for; and if the political communications are not paid for by anybody by the end of a first-timer initiated, creating the slate of political communications for free, setting a second timer, and if the other parties do not pay after the second timer, end the political communicating cycle.

A person having ordinary skill in the art will appreciate that the scope of the disclosure is not limited to realizing the application server 104 and the one or more mobile devices 108 as separate entities. In an embodiment, the application server 104 may be realized as an application program installed on and/or running on one or more mobile devices 108 without departing from the scope of the disclosure.

In an embodiment, the communication network 106 may correspond to a communication medium through which the database server 102, the application server 104, and the one or more mobile devices 108 may communicate with each other. Such communication may be performed, in accordance with various wired and wireless communication protocols. Examples of such wired and wireless communication protocols include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, 2G, 3G, 4G cellular communication protocols, and/or Bluetooth (BT) communication protocols. The communication network 106 may include but is not limited to, the Internet, a cloud network, a Wireless Fidelity (Wi-Fi) network, a Wireless Local Area Network (WLAN), a Local Area Network (LAN), a telephone line (POTS), and/or a Metropolitan Area Network (MAN).

In an embodiment, the one or more mobile devices 108 may refer to a computing device used by one or more users. The one or more mobile devices 108 may comprise of one or more processors and one or more memories. The one or more memories may include computer-readable code that may be executable by one or more processors to perform predetermined operations. In an embodiment, the one or more mobile devices 108 may present a user interface, received from the application server 104, to the one or more users to display the content related to political communication on a display screen of the one or more mobile devices 108 associated with the one or more users. Examples of the one or more mobile devices 108 may include but are not limited to, a personal computer, a laptop, a personal digital assistant (PDA), a mobile device, a tablet, or any other computing device.

Figure 2:
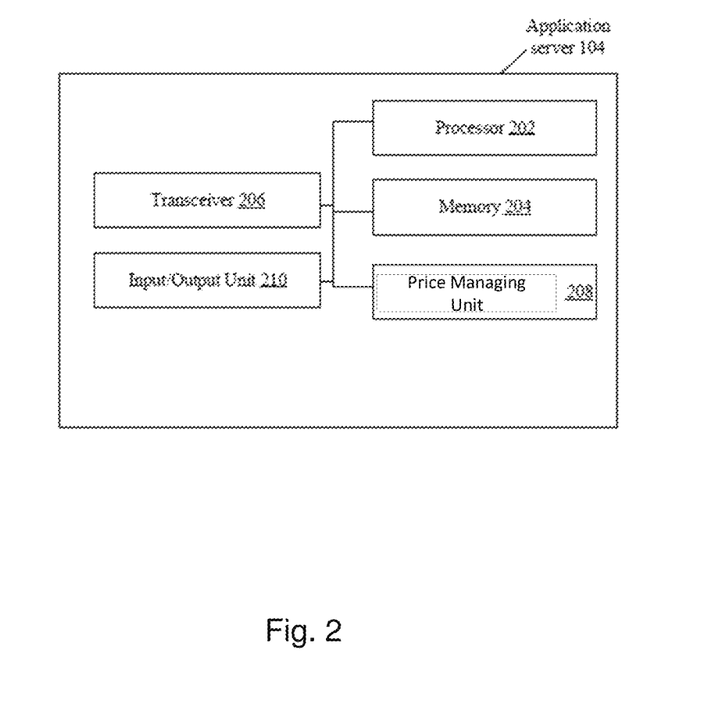
FIG. 2 is a block diagram that illustrates an application server configured to manage and monitor leverage relating to low margins of a win in one or more swing districts to command higher prices for political communication, in accordance with at least one embodiment.

FIG. 2 is a block diagram that illustrates an application server 104 configured to manage and monitor leverage relating to low margins of a win in one or more swing districts to command higher prices for political communication, in accordance with at least one embodiment. FIG. 2 is explained in conjunction with elements from FIG. 1. In an embodiment, the application server 104 includes a processor 202, a memory 204, a transceiver 206, a price managing unit 208, and an input/output unit 210. The processor 202 may be communicatively coupled to the memory 204, the transceiver 206, price managing unit 208, and the input/output unit 210. The transceiver 206 may be communicatively coupled to the communication network 106.

The processor 202 comprises suitable logic, circuitry, interfaces, and/or code that may be configured to execute a set of instructions stored in the memory 204. The processor 202 may be implemented based on several processor technologies known in the art. The processor 202 works in coordination with the transceiver 206, the price managing unit 208, and the input/output unit 210 to manage and monitor leverage relating to low margins of a win in one or more swing districts to command higher prices for political communicating. Examples of the processor 202 include but are not limited to, an X86-based processor, a Reduced Instruction Set Computing (RISC) processor, an Application-Specific Integrated Circuit (ASIC) processor, a Complex Instruction Set Computing (CISC) processor, and/or other processors.

The memory 204 comprises suitable logic, circuitry, interfaces, and/or code that may be configured to store the set of instructions, which are executed by the processor 202. In an embodiment, the memory 204 may be configured to store one or more programs, routines, or scripts that are executed in coordination with the processor 202. The memory 204 may be implemented based on a Random-Access Memory (RAM), a Read-Only Memory (ROM), a Hard Disk Drive (HDD), a storage server, and/or a Secure Digital (SD) card.

The transceiver 206 comprises suitable logic, circuitry, interfaces, and/or code that may be configured to receive the content related to political communicating from the database server 102, via the communication network 106. The transceiver 206 may be further configured to select at least one of one or more candidates, and a political party per election for one or more elections via one or more mobile devices 108. The transceiver 206 may be further configured to transmit the content related to political communicating to one or more display screens of the mobile devices 108, via the communication network 106. The transceiver 206 may implement one or more known technologies to support wired or wireless communication with the communication network 106. In an embodiment, the transceiver 206 may include, but is not limited to, an antenna, a radio frequency (RF) transceiver, one or more amplifiers, a tuner, one or more oscillators, a digital signal processor, a Universal Serial Bus (USB) device, a coder-decoder (CODEC) chipset, a subscriber identity module (SIM) card, and/or a local buffer. The transceiver 206 may communicate via wireless communication with networks, such as the Internet, an Intranet, and/or a wireless network, such as a cellular telephone network, a wireless local area network (LAN), and/or a metropolitan area network (MAN). The wireless communication may use any of a plurality of communication standards, protocols, and technologies, such as: Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

The price managing unit 208 comprises suitable logic, circuitry, interfaces, and/or code that may be configured to create a slate of one or more political communications, and one or more endorsements on behalf of a major candidate if the one or more political communication requests and payments are received within a period of the timers. The price managing unit 208 may be further configured to offer at least one of one or more paid slate of political communications, and one or more slate of endorsements each, on behalf of each candidate and the political party. The price managing unit 208 may be further configured to provide only one paid slate of political communications to one or more solicited candidate constituencies per election cycle. The price managing unit 208 may be further configured to initiate one or more timers and receive one or more political communication requests and payments.

The input/output unit 210 comprises suitable logic, circuitry, interfaces, and/or code that may be configured to provide one or more inputs to the application server 104 during the creation of the slate of one or more political communications, and one or more endorsements. The input/output unit 210 comprises various input and output devices that are configured to communicate with the processor 202. Examples of the input devices include, but are not limited to, a keyboard, a mouse, a joystick, a touch screen, a microphone, a camera, and/or a docking station. Examples of the output devices include, but are not limited to, a display screen and/or a speaker.

In operation, the processor 202 works in coordination with the transceiver 206, the price managing unit 208, and the input/output unit 210 to low margins of a win in one or more swing districts to command higher prices for political communication. In an embodiment, the one or more mobile devices 108 of the one or more users may be configured to select at least one of one or more candidates, and a political party per election for one or more elections via one or more mobile devices 108. In an embodiment, the candidate, and the political party receive a free slate of political communications. In an embodiment, the transceiver 206 may be configured to offer at least one of one or more paid slates of political communications, and one or more slates of endorsements each, on behalf of each candidate and the political party. In an embodiment, the transceiver 206 may be configured to provide only one paid slate of political communications to one or more solicited candidate constituencies per election cycle. In an embodiment, the transceiver 206 may be configured to initiate one or more timers and receive one or more political communication requests and payments. In an embodiment, the transceiver 206 may be configured to create a slate of one or more political communications, and one or more endorsements on behalf of a major candidate if the one or more political communications requests and payments are received within a period of the timers. In an embodiment, the transceiver 206 may be configured to reject the one or more political communication requests, and the payments within the election cycle upon expiration of the timers.

A person skilled in the art will understand that the scope of the disclosure should not be limited to the creation of the slate of one or more political communications, and one or more endorsements based on the aforementioned factors and using the aforementioned techniques. Further, the examples provided in the specification are for illustrative purposes and should not be construed to limit the scope of the disclosure.

Figure 3:
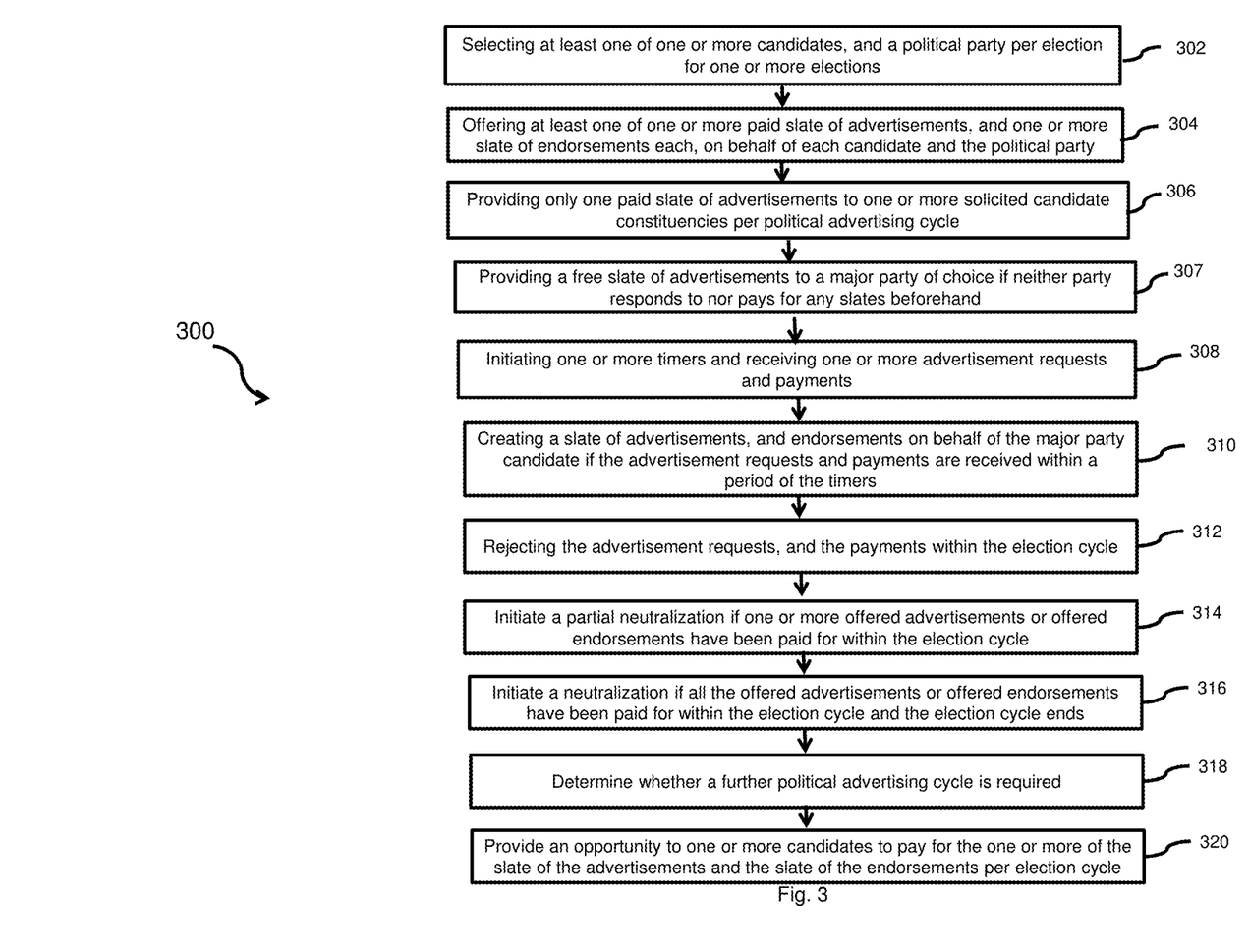
FIG. 3 is a flowchart that illustrates a method for management and monitoring of leverage relating to low margins of a win in one or more swing districts to command higher prices for political communications, in accordance with at least one embodiment.

FIG. 3 is a flowchart that illustrates a method for management and monitoring of leverage relating to low margins of a win in one or more swing districts to command higher prices for political communication, in accordance with at least one embodiment. The flowchart 300 is described in conjunction with FIG. 1 and FIG. 2. At step 302, the application server may be configured to select at least one of one or more candidates and a political party per election for one or more elections. In an embodiment, one or more of the candidates, and the political party receive a free slate of political communications. At step 304, the application server may be configured to offer at least one of one or more paid slate of political communications, and one or more slate of endorsements each, on behalf of each candidate and the political party. At step 306, the application server may be configured to provide only one paid slate of political communications to one or more solicited candidate constituencies per political communication cycle. At step 307, the application server may be configured to provide a free slate of political communications to a major candidate of choice if neither party responds to nor pays for any slates beforehand. At step 308, the application server may be configured to initiate one or more timers and receive one or more political communication requests and payments. At step 310, the application server may be configured to create a slate of one or more political communications, and one or more endorsements on behalf of a major candidate if the one or more political communication requests and payments are received within a period of the timers. At step 312, the application server may be configured to reject the one or more political communication requests, and the payments within the election cycle upon expiration of the timers. At step 314, the application server may be configured to initiate a partial neutralization if one or more offered political communications or offered endorsements have been paid for within the election cycle and the timers have expired with no opportunity for further payment. At step 316, the application server may be configured to initiate a neutralization if all the offered political communications or offered endorsements have been paid for within the election cycle and the election cycle ends. At step 318, the application server may be configured to determine whether a further political communication cycle is required. At step 320, the application server may be configured to provide an opportunity to one or more candidates to pay for the one or more of the slate of the political communications and the slate of the endorsements per election cycle. In an embodiment, the candidates may receive an additional opportunity to pay for an ad or endorsement slate per election cycle.

In operation, the present system and method require an election with a low margin of win, a 527 organization, and a select number of political communications in a specific order. The process requires the establishment of 1 or more "Organizations authorized to primarily influence the selection, nomination, election, appointment, or defeat of candidates to federal, state, or local public office" (also known as a 527 Organization). In an embodiment, the present system distributes political communications on behalf of specific candidates, in specific areas around the United States, ones with low margins of victory between the major candidates. These political communications are to be distributed in a specific order with a specific method, in accordance with FEC guidelines, in the slates.

According to an embodiment herein, the present system distributes one FREE slate of ads to the organization(s) on behalf of a major candidate of choice. Then, the organization is to offer to distribute one political communications on behalf of each major candidate, to be paid for. If one slate of political communication is paid for, create and distribute one or more political communications on behalf of the major candidate. The present system and method provide "third party" (or any non/anti-two-party political entity) with significantly greater political power, by leveraging possible congressional power over major parties' heads, at greater expense to the major parties, despite having lesser numbers. Current laws do not stipulate that any set of political communications be "singular" or for only one party.

If an entity can convince a number of people larger than the margin of win of the area to vote in the manner directed by the political communications, the political communications can be sold at significantly higher amounts. While a voter directly receiving compensation in consideration of their vote is illegal, this is effectively a way to legally sell relatively small voting blocks in support of major candidates, threatening a nearly guaranteed victory in a given area depending on the size of the margin and the number of voters reached.

Instead of gathering money to create political communications to gather voters who can be convinced to vote in sync, create a series of political communications as a mobilizing tool for the voting block, and collect an amount of money proportional to the amount of influence this decision has on that level of election, and dispose of the money in a way that does not constitute an illegal purchase of a vote.

Computer System

Figure 4:
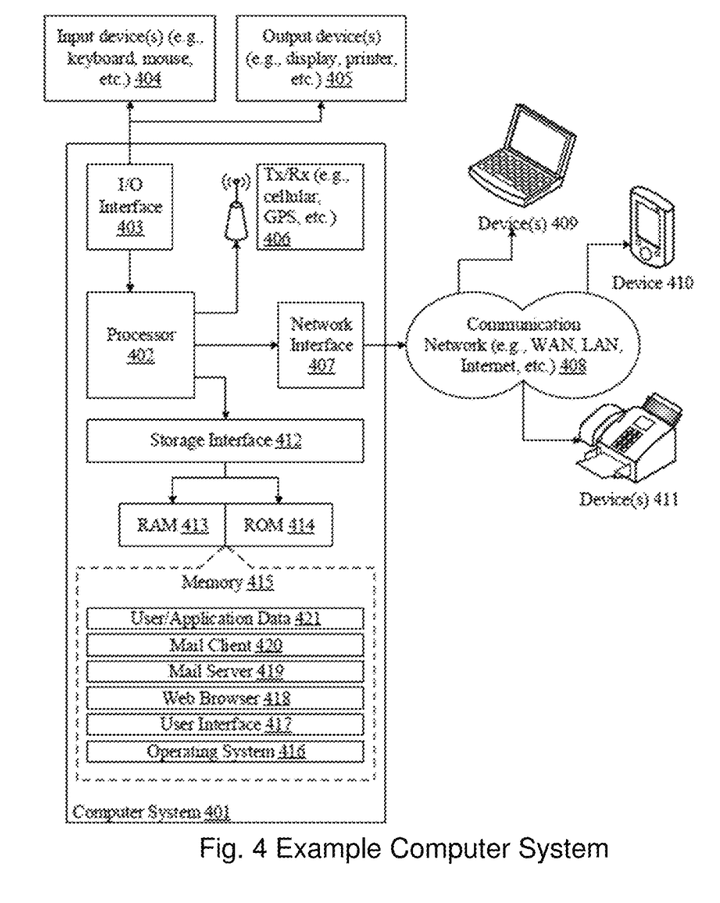
FIG. 4 illustrates a block diagram of an exemplary computer system for implementing embodiments consistent with the present disclosure.

FIG. 4 illustrates a block diagram of an exemplary computer system for implementing embodiments consistent with the present disclosure. Variations of computer system 401 may be used for performing optical character recognition on an image including a plurality of printed characters. The computer system 401 may comprise a central processing unit ("CPU" or "processor") 402. Processor 402 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating-point units, graphics processing units, digital signal processing units, etc. The processor may include a microprocessor, such as AMD Athlon, Duron, or Opteron, ARM's application, embedded or secure processors, IBM PowerPC, Intel's Core, Itanium, Xeon, Celeron, or other lines of processors, etc. The processor 402 may be implemented using a mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 402 may be disposed in communication with one or more input/output (I/O) devices via I/O interface 403. The I/O interface 403 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 403, the computer system 401 may communicate with one or more I/O devices. For example, the input device 404 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 405 may be a printer, fax machine, video display (e.g., cathode ray tube (CRT), liquid crystal display (LCD), light-emitting diode (LED), plasma, or the like), audio speaker, etc. In some embodiments, a transceiver 406 may be disposed in connection with the processor 402. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, a global positioning system (GPS), 2G/3G HSDPA/HSUPA communications, etc.

In some embodiments, the processor 402 may be disposed in communication with a communication network 408 via a network interface 407. The network interface 407 may communicate with the communication network 408. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 408 may include, without limitation, a direct interconnection, local area network (LAN), wide area network (WAN), wireless network (e.g., using Wireless Application Protocol), the Internet, etc. Using the network interface 407 and the communication network 408, the computer system 401 may communicate with devices 410, 411, and 412. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 501 may itself embody one or more of these devices.

In some embodiments, the processor 402 may be disposed of in communication with one or more memory devices (e.g., RAM 413, ROM 414, etc.) via a storage interface 412. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent disks (RAID), solid-state memory devices, solid-state drives, etc.

The memory devices may store a collection of program or database components, including, without limitation, an operating system 416, the user interface application 417, web browser 418, mail server 419, mail client 420, user/application data 421 (e.g., any data variables or data records discussed in this disclosure), etc. The operating system 416 may facilitate resource management and operation of the computer system 401. Examples of operating systems include, without limitation, Apple Macintosh OS X, UNIX, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 417 may facilitate the display, execution, interaction, manipulation, or operation of program components through textual or graphical facilities. For example, user interfaces may provide computer interaction interface elements on a display system operatively connected to the computer system 401, such as cursors, icons, checkboxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 401 may implement a web browser 418 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 401 may implement a mail server 419 stored program component. The mail server may be an Internet mail server such as Microsoft Exchange, or the like. The mail server may utilize facilities such as ASP, ActiveX, ANSI C++/C #, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 401 may implement a mail client 420 stored program component. The mail client may be a mail viewing application, such as Apple Mail, Microsoft Entourage, Microsoft Outlook, Mozilla Thunderbird, etc.

In some embodiments, computer system 401 may store user/application data 421, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of any computer or database component may be combined, consolidated, or distributed in any working combination.

Figure 5:
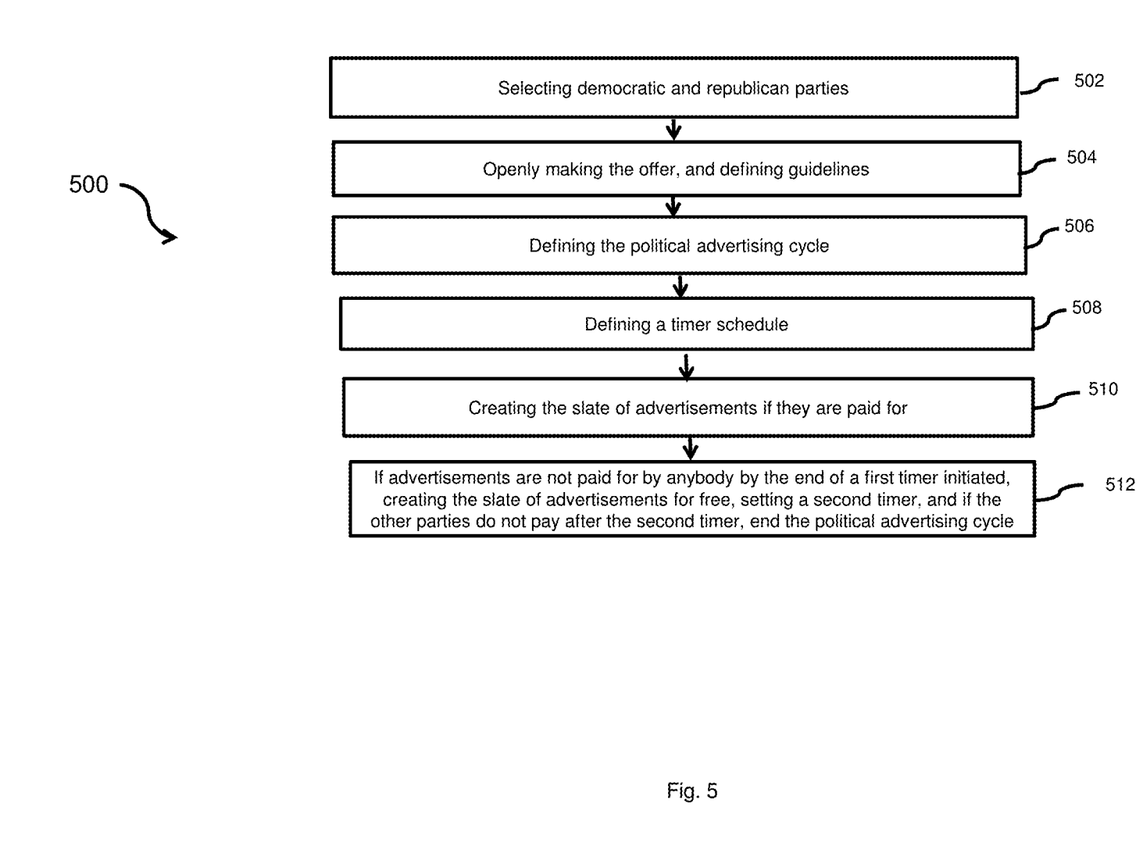
FIG. 5 is a flowchart that illustrates a plurality of operational steps performed by the present invention, in accordance with at least one embodiment.

FIG. 5 is a flowchart 500 that illustrates a plurality of operational steps performed by the present invention, in accordance with at least one embodiment. The operational steps comprising a step 502 of selecting democratic and republican parties. The operational steps comprising a step 504 of openly making the offer, and defining guidelines. The operational steps comprising a step 506 of defining the political communication cycle. The operational steps comprising a step 508 of defining a timer schedule. Further, the operational steps comprising a step 510 of creating the slate of political communications if they are paid for. At step 512, if the political communications are not paid for by anybody by the end of a first-timer initiated, creating the slate of political communications for free, setting a second timer, and if the other parties do not pay after the second timer, end the political communicating cycle.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Various embodiments of the disclosure encompass numerous advantages including methods and systems for management and monitoring of leverage relating to low margins of a win in one or more swing districts to command higher prices for political communication. In an embodiment, the methods and systems may be utilized to provide target political communicating to voters in areas where an average margin of victory between major parties/candidates is lower than the average number of citizens with the capacity to vote, who do not vote for major candidates. Further, the present system and method allow for the legal sale of a voting block, at a higher price than traditional political communicating. Furthermore, the present system and method present the third-party political groups with a more potent strategy for getting the attention of the major parties. Furthermore, the present system and method prevent balkanization. If multiple third-party groups decide to try to do this process, with no coordination, it diminishes the value of the patent by threatening elections and major parties in opposing directions. The value of the process is facilitated by the number of people a group running this can convince, the size of the margin of win in the area targeted, the balance of power between the major parties in the area, and the average amount of outside spending in regards to that election. At current, sociopolitical power and margin sizes are balanced enough to make the monetary value of any ads created with this process, and thus the process itself, high.

The present disclosure may be realized in hardware or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

A person with ordinary skills in the art will appreciate that the systems, modules, and sub-modules have been illustrated and explained to serve as examples and should not be considered limiting in any manner. It will be further appreciated that the variants of the above-disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like. The claims can encompass embodiments for hardware and software, or a combination thereof.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method for creating a competitive third-party political communication slate, the method comprising:
    selecting, by one or more processors, at least one of one or more candidates, and a political party per election for one or more elections via one or more mobile devices, wherein one or more of the candidate, and the political party receive a free slate of political communication;
    offering, by the one or more processors, at least one of one or more paid slate of political communications, and one or more slate of endorsements each, on behalf of each candidate and the political party;

providing, by the one or more processors, only one paid slate of political communications to one or more solicited candidate constituencies per political communication cycle;

providing, by the one or more processors, a free slate of political communications to a target candidate of choice if neither party responds to nor pays for any slates beforehand;

initiating, by the one or more processors, one or more timers, and receiving one or more political communication requests and payments;

creating, by the one or more processors, a slate of one or more political communications on behalf of the target candidate if the one or more political communication requests and payments are received within a period of the timers;

upon expiration of the timers, rejecting, by the one or more processors, the one or more political communication requests, and the payments within an election cycle; and upon determining that all offered slates of political communications or endorsements have been paid for and a political communication cycle has ended, initiating, by one or more processors, a neutralization process comprising executing an equitable vote-splitting algorithm configured to:

(i) retrieve, for each electoral district, auditable election metrics;

(ii) calculate, based on the auditable metrics and existing rules and guidelines, a predicted allocation of votes necessary to approximate a zero-sum distribution of electoral influence across the relevant districts, thereby nullifying any net advantage produced by prior political communication slates;

(iii) determine, based on the rule sets and predicted vote allocations, whether to suppress an existing political communication slate or generate a new neutralizing slate for distribution;

(iv) construct at least one neutralizing political communication slate configured to produce the zero-sum distribution of influence and associate the slate with one or more known voting blocks; and (v) transmit the neutralizing slate to the identified voting blocks via one or more media distribution channels.

2. The method of claim 1, further comprising initiating a partial neutralization if one or more offered political communications have been paid for within the election cycle and the timers have expired with no opportunity for further payment, wherein the partial neutralization comprises creating a political communication or endorsement on behalf of all paying parties without offering further political communication slates to non-paying parties within the election cycle, and allowing voters to vote without specific coordination efforts.

3. The method of claim 1, further comprising initiating a neutralization if all the offered political communications have been paid for within the election cycle and the election cycle ends.

4. The method of claim 1, further comprising determining whether a further political communication cycle is required.

5. The method of claim 1, further comprising providing an opportunity to one or more candidates to pay for the one or more of the slate of the political communications and the slate of the endorsements per election cycle.

6. The method of claim 1, further comprising a plurality of operational steps comprising: selecting democratic and republican parties; openly making the offer, and defining guidelines; defining the political communication cycle; defining a timer schedule; creating the slate of political communications if they are paid for; and if the political communications are not paid for by anybody by the end of a first-timer initiated, creating the slate of political communications for free, setting a second timer, and if the other parties do not pay after the second timer, end the political communication cycle.

7. The method of claim 1, wherein the audible election metrics include turnout data, vote shares, and third-party performance.

8. The method of claim 1, further comprising collecting, after an electoral event, a second set of auditable election metrics associated with the targeted voting blocks.

9. The method of claim 1, further comprising comparing the predicted allocation of votes to the second set of auditable election metrics to determine the degree of influence neutralization achieved and store adjustment parameters for future vote allocation models.

10. An application server to create a competitive third-party political communication slate, the application server comprising:

a processor; and a memory communicatively coupled to the processor, wherein the memory stores processor instructions, which, on execution, causes the processor to:

select at least one of one or more candidates, and a political party per election for one or more elections via one or more mobile devices, wherein one or more of the candidates, and the political party receive a free slate of political communication;

offer at least one of one or more paid slate of political communications, and one or more slate of endorsements each, on behalf of each candidate and the political party;

provide only one paid slate of political communications to one or more solicited candidate constituencies per political communications cycle;

provide a free slate of political communications to a target candidate of choice if neither party responds to nor pays for any slates beforehand;

initiate one or more timers and receive one or more political communication requests and payments;

create a slate of one or more political communications, and one or more endorsements on behalf of a target candidate if the one or more political communication requests and payments are received within a period of the timers;

upon expiration of the timers, reject the one or more political communication requests, and the payments within an election cycle.; and upon determining that all offered slates of political communications or endorsements have been paid for and a political communication cycle has ended, initiating, by one or more processors, a neutralization process comprising executing an equitable vote-splitting algorithm configured to:

(i) retrieve, for each electoral district, auditable election metrics;

(ii) calculate, based on the auditable metrics and existing rules and guidelines, a predicted allocation of votes necessary to approximate a zero-sum distribution of electoral influence across the relevant districts, thereby nullifying any net advantage produced by prior political communication slates;

(iii) determine, based on the rule sets and predicted vote allocations, whether to suppress an existing political communication slate or generate a new neutralizing slate for distribution;

(iv) construct at least one neutralizing political communication slate configured to produce the zero-sum distribution of influence and associate the slate with one or more known voting blocks; and (v) transmit the neutralizing slate to the identified voting blocks via one or more media distribution channels.

11. The application server of claim 10, wherein the one or more processors are further configured to initiate a partial neutralization if one or more offered political communications have been paid for within the election cycle and the timers have expired with no opportunity for further payment, wherein the partial neutralization comprises creating a political communication or endorsement on behalf of all paying parties without offering further political communication slates to non-paying parties within the election cycle, and allowing voters to vote without specific coordination efforts.

12. The application server of claim 10, wherein the one or more processors are further configured to initiate a neutralization if all the offered political communications have been paid for within the election cycle and the election cycle ends.

13. The application server of claim 10, wherein the one or more processors are further configured to determine whether a further political communication cycle is required.

14. The application server of claim 10, wherein the one or more processors are further configured to provide an opportunity to one or more candidates to pay for the one or more of the slate of the political communications and the slate of the endorsements per election cycle.

15. The application server of claim claim 10, wherein the one or more processors are further configured to perform a plurality of operational steps comprising: selecting democratic and republican parties; openly making the offer, and defining guidelines; defining the political communications cycle; defining a timer schedule; creating the slate of political communications if they are paid for; and if the political communications are not paid for by anybody by the end of a first-timer initiated, creating the slate of political communications for free, setting a second timer, and if the other parties do not pay after the second timer, end the political communications cycle.

* * * * *